United States Patent

[11] 3,609,500

| [72] | Inventors | Roy Causer<br>Wantage;<br>Eric Ronald Rein, Newbury, both of England |
|---|---|---|
| [21] | Appl. No. | 882,433 |
| [22] | Filed | Dec. 5, 1969 |
| [45] | Patented | Sept. 28, 1971 |
| [73] | Assignee | United Kingdom Atomic Energy Authority<br>London, England |
| [32] | Priority | Dec. 5, 1968 |
| [33] | | Great Britain |
| [31] | | 57,923/68 |

[54] STEPPING MOTOR HAVING AN ODD NUMBER OF WINDINGS, THE WINDINGS BEING ENERGIZED AT ALL TIMES
4 Claims, 4 Drawing Figs.

[52] U.S. Cl. .................................................... 318/696
[51] Int. Cl. ...................................................... G05b 19/40
[50] Field of Search .......................................... 318/138,
254; 310/49; 313/696, 685

[56] References Cited

UNITED STATES PATENTS

| 2,454,519 | 11/1948 | McNaney ...................... | 310/49 X |
| 3,077,555 | 2/1963 | Fredrickson ................. | 310/49 X |
| 3,297,927 | 1/1967 | Blakeslee et al. ............. | 310/49 X |
| 3,311,911 | 3/1967 | Pursiano et al. .............. | 310/49 X |
| 3,354,367 | 11/1967 | Stockebrand ................ | 318/138 |
| 3,381,151 | 4/1968 | Stenudd ....................... | 310/49 |
| 3,467,902 | 9/1969 | Shimizu et al. ............... | 318/138 |
| 3,508,130 | 4/1970 | Buskiru ........................ | 318/138 |

Primary Examiner—B. R. Simmons
Attorney—Larson, Taylor & Hinds

ABSTRACT: The stepping motor is wound with five star-connected field windings. Drive for five-phase operation is generated with logic circuitry having provision for forward and reverse. Increased torque as compared with a conventional three-phase system, and equal torque per step are achieved.

STEPPING MOTOR HAVING AN ODD NUMBER OF WINDINGS, THE WINDINGS BEING ENERGIZED AT ALL TIMES

BACKGROUND OF THE INVENTION

The invention concerns improvements in the stepping motor arrangements. It will be well known that a stepping motor can be used for finely controlled movement of a drive shaft or the like since by control of the stepping motor a precise degree of advance is imparted to an initial drive shaft and a reduction gearing can be interposed between the initial and final drive shafts.

SUMMARY OF THE INVENTION

The invention provides a stepping motor for providing 10 steps per revolution comprising five field windings connected in star configuration with a common central electrical connection, the five separate electrical connections at the respective other ends of the windings being equiangularly spaced from one another.

According to the present invention there is also provided a stepping motor arrangement comprising a motor having an odd number of star-connected field windings and a logic circuit driven by a succession of pulses for connecting the windings in due order to two alternative voltage levels relative to the star point, the windings being energized at all times.

In the preferred arrangement five field windings are provided and the motor is then a 10-step motor. The logic circuit and electrical connections are so arranged that each pulse causes the motor to make one step and consequently the revolutions of the motor can easily be counted by counting the pulses using a conventional decade scaler. Preferably the succession of pulses is generated by a clock pulse generator.

Since all the windings are energized at all times and are switched between only two alternative voltage levels an increased torque is provided. Moreover, by using a motor with an odd number of windings and twice that number of steps per revolution, equal torque per step can also be arranged.

Preferably the logic circuit comprises a number, equal to the number of field windings, of bistable elements each having first and second outputs, a transfer signal input and a switching input, each bistable element providing an output signal alternatively at the first or second output in dependence upon the signal applied to the transfer signal input, the bistable element taking up the state dictated by the transfer input signal only when a signal pulse is applied to the said switching input, a generator of a succession of signal pulses being connected to the switching inputs of the bistable elements, transfer input signals for one bistable element being derived from another bistable element so that the succession of signal pulses applied to the switching inputs causes a cyclic sequence of changes of state of the bistable elements, the field windings being connected in due order to the two alternative voltage levels through a switching mechanism controlled by the outputs of the bistable elements.

Certain of the field windings are switched under the control of the first outputs of the bistable elements associated respectively with those field windings, while the other field windings are switched under the control of the second outputs of the respective associated bistable elements.

Preferably alternatively operable configurations of interconnection between the outputs and the transfer inputs of the bistable elements are provided corresponding to forward and reverse driving cycles respectively, and means are provided for selecting which configuration of interconnection is rendered operative.

BRIEF DESCRIPTION OF THE DRAWINGS

A specific construction of stepping motor arrangement embodying the invention will now be described by way of example and with reference to the accompanying drawings wherein.

DESCRIPTION OF PREFERRED EMBODIMENT

Figure 1:
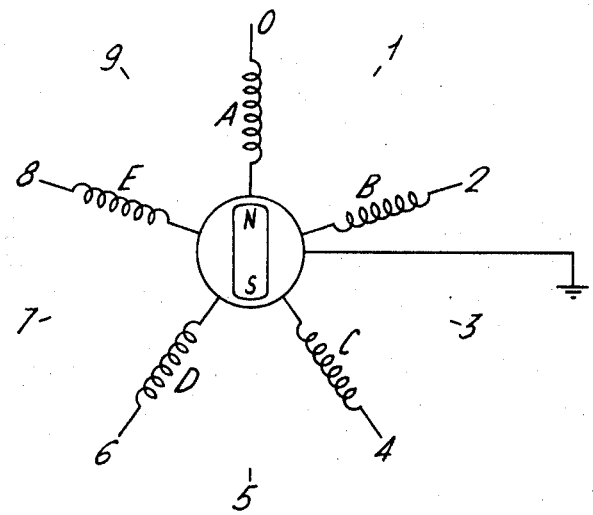
FIg. 1 is a circuit diagram of the motor.

Referring now to the drawings, FIG. 1 is the circuit diagram for a 10-step motor having steps 0–9 as indicated. The motor has five pairs of stator coils A to E which are shown singly in the diagram, these coils being star-connected and being equiangularly spaced at 72° to each other. The rotor carries a diametrically magnetized permanent magnet having poles N and S. As stated previously, all the windings are energized at all times but in order to rotate the magnetic field of the stator the windings are connected in due order to two alternative voltage levels. In this case the voltage levels of +14 volts and −14 volts relative to the star point are selected. As the magnetic field of the stator is rotated, the magnet turns the rotor to realign itself with each new position of this magnetic vector. The switching pattern required to cause the magnetic field to rotate in a clockwise direction is shown in Table I.

TABLE I.—SWITCHING PATTERN FOR TEN STEP PER REVOLUTION MOTOR

| Phase winding: | Position | | | | | | | | | |
|---|---|---|---|---|---|---|---|---|---|---|
| | 0 | 1 | 2 | 3 | 4 | 5 | 6 | 7 | 8 | 9 |
| A | + | + | + | − | − | − | − | − | + | + |
| B | + | + | + | + | + | − | − | − | − | − |
| C | − | − | + | + | + | + | + | − | − | − |
| D | − | − | − | − | + | + | + | + | + | − |
| E | + | − | − | − | − | − | + | + | + | + |

A comparison of the torque of this 10 step motor with a conventional 12 step motor shows that if the power per coil is assumed to be equal in each case the torque ratio is 1.618 in favor of the 10-step motor. This is because of the way in which the torque vectors add in the five-phase system, as compared with the three-phase system. Moreover, equal torque per step is achieved because all the windings are energized whereas in the conventional 12-step motor (using three-phase field windings) for certain positions only two of the field windings are energized.

In practice, it is easier to arrange the field windings of the five-phase system in the required locations around the motor. Further, the heaviest load on any one winding is when the current flows from three windings into two. This compares with current flowing from two windings into one in the three-phase system. Thus, the five-phase system of this example has the further advantage when compared with a three-phase system that, for a given field winding resistance and given voltage across the windings, the maximum current in any one coil is less.

Figure 2:
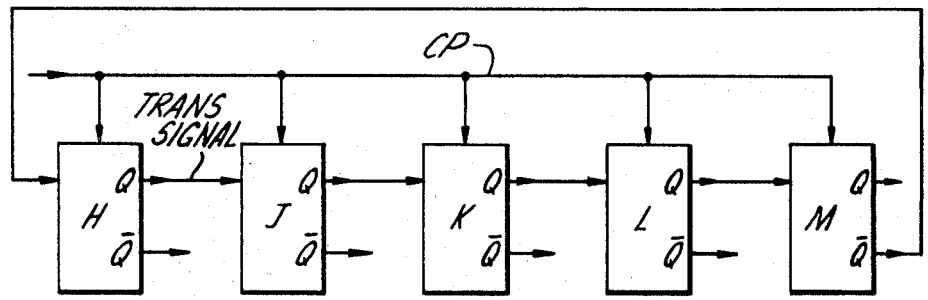
FIG. 2 shows a known logic circuit.

The switching pattern of Table I can be derived from a conventional Johnson ring counter as illustrated in FIG. 2. In FIG. 2 the five units H to M are standard D-type flip-flops which operate only when a clock pulse is applied on the line CP. Each flip-flop has, as shown, a transfer signal input, a clock pulse signal input, and two outputs labeled Q and $\overline{Q}$. In the conventional Johnson ring counter the Q outputs are used for a transfer signal except in the case of the last flip-flop M where the transfer signal is taken from the $\overline{Q}$ output and connected to the transfer signal input of flip-flop H.

The "Truth Table" of the conventional Johnson ring counter is shown in Table II and it will be seen that although similar to Table I it is in fact different.

TRUTH TABLE II

| Position | | 0 | 1 | 2 | 3 | 4 | 5 | 6 | 7 | 8 | 9 |
|---|---|---|---|---|---|---|---|---|---|---|---|
| H | Q | 0 | 1 | 1 | 1 | 1 | 1 | 0 | 0 | 0 | 0 |
| J | Q | 0 | 0 | 1 | 1 | 1 | 1 | 1 | 0 | 0 | 0 |
| K | Q | 0 | 0 | 0 | 1 | 1 | 1 | 1 | 1 | 0 | 0 |
| L | Q | 0 | 0 | 0 | 0 | 1 | 1 | 1 | 1 | 1 | 0 |
| M | Q | 0 | 0 | 0 | 0 | 0 | 1 | 1 | 1 | 1 | 1 |

The use of the complementary outputs $\overline{Q}$ of flip-flop units K, M and H provides the correct Truth Table as can be seen from Table III. Thus Table III is effectively identical to Table I.

TRUTH TABLE III

| Phase winding: | | | Position | | | | | | | | | |
|---|---|---|---|---|---|---|---|---|---|---|---|---|
| | | | 0 | 1 | 2 | 3 | 4 | 5 | 6 | 7 | 8 | 9 |
| A | K | $\overline{Q}$ | 1 | 1 | 1 | 0 | 0 | 0 | 0 | 0 | 1 | 1 |
| B | M | $\overline{Q}$ | 1 | 1 | 1 | 1 | 1 | 0 | 0 | 0 | 0 | 0 |
| C | J | Q | 0 | 0 | 1 | 1 | 1 | 1 | 1 | 0 | 0 | 0 |
| D | L | L | 0 | 0 | 0 | 0 | 1 | 1 | 1 | 1 | 1 | 0 |
| E | H | $\overline{Q}$ | 1 | 0 | 0 | 0 | 0 | 0 | 1 | 1 | 1 | 1 |

Thus using the circuits of FIGS. 1 and 2, phase winding A is connected to the $\overline{Q}$ output of flip-flop K and so on as shown in Table III.

It is important in a stepping motor of this type that upon reversal of the motor or upon instructions being given for reversal to occur at the next step, the actual position of the rotor should not be changed. It will be apparent that the system of the present invention is not sensitive to the direction of rotation of the ring counter of FIG. 2. Similarly there can be no omission of steps since the clock pulses ensure that the ring counter operates in the correct manner. It will also be apparent that by simply counting the clock pulses the number of rotations of the rotor can easily be derived using a standard decade scaler.

Figure 3:
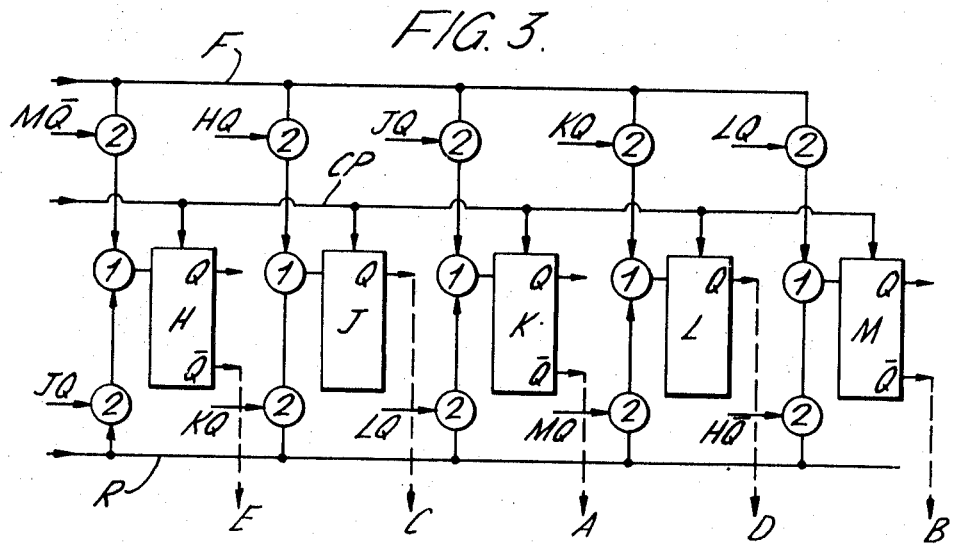
FIG. 3 shows the logic circuit of FIG. 2 as developed for the present invention.

In order to provide for reversal, the circuit of FIG. 3 is used and in this circuit the transfer pulses occurring at the Q and $\overline{Q}$ outputs are taken via "exclusive OR" gates controlled by reversal signals. FIG. 3 also shows the connection to the rotor windings. Each exclusive OR gate comprises a gate marked 2 which passes a signal only when it has signals on each of its two inputs, (in other words and AND gate) linked to a gate marked 1 which passes a signal only when it has a signal on one of its two inputs (in other words an OR gate). The clock pulses as previously described are applied to the line CP and, for forward motion, a voltage is applied to a line F. For reverse motion, the voltage is applied to a line R, instead of to the line F. Taking the case of forward motion and the flip-flop H, the transfer signal from the output Q of the flip-flop H, the transfer signal from the output $\overline{Q}$ of the flip-flop M is present at one input of one of the two OR gates and is also present on the other OR gate associated with the flip-flop L. A voltage level for forward motion is applied to line F and thus the condition is satisfied that the OR gate should be conducting and the signal is passed through the AND gate to the transfer input of flip-flop H. The signal output from the flip-flop H is taken from the $\overline{Q}$ output and is operative to control a switching mechanism (FIG. 4) to connect the winding E of the motor to the +14 volt line.

Figure 4:
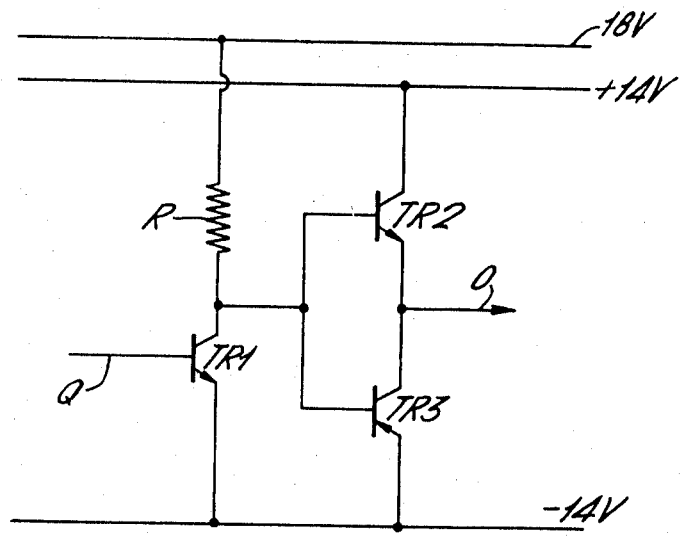
FIG. 4 is a motor output circuit.

Each of the five outputs from the circuit of Fig. 3 goes to its own switching circuit which is shown in FIG. 4. The signal appears on the line marked Q in FIG. 4 and controls a first transistor TR1 which is supplied from an 18 volt line via a resistor R. The transistor TR1 in turn controls a pair of output transistors TR2 and TR3 connected in an emitter follower formation between the +14 and −14 volt lines. The control is such to ensure that when one of the output transistors is on the other is off and so the voltages of +14 volts and −14 are alternatively connected to the appropriate motor windings through the output line 0.

Thus, for example, an output signal upon output $\overline{Q}$ of flip-flop H in FIG. 3 will be applied to the base of a transistor corresponding to TR1 in a switching circuit corresponding to the circuit of FIG. 4. This transistor (TR1) will be rendered conducting which will result in transistor (TR2) conducting and transistor (TR3) switching off. The output O, in this case, is connected to the field winding E of the motor. Thus, in the circumstances described, the winding E will be energized from the +14 volt line. When there is no output from $\overline{Q}$ of flip-flop H, transistor (TR3) will be conducting and transistor (TR2) will be switched off. Then the winding E will be energized from the −14 volt line.

The principle above-described can be employed with motors having any odd number of windings (except of course a single winding).

We claim:

1. A stepping motor arrangement comprising a motor having an odd number P of star-connected field windings, the effective star point being connected to a reference voltage level, switchable means for connecting each of the windings alternately to first and second voltage levels, the first voltage level being positive with respect to the reference and the second voltage level being negative with respect to the reference but of equal magnitude to the first voltage level, and logic circuit means, driven by a succession of pulses, for controlling the switchable means to connect the windings in due order to the first and second voltage levels for stepping the motor through 2P steps per revolution, the windings being energized at all times.

2. A stepping motor arrangement as claimed in claim 1 wherein the logic circuit comprises a number, equal to the number of field windings, of bistable elements each having first and second outputs, and being controlled by signals to not more than two inputs comprising respectively a transfer signal input and a switching input, each said bistable element providing an output signal alternately at the first or second output in dependence upon the signal level sensed at the transfer signal input, the bistable element taking up the state dictated by the transfer input signal only when a signal pulse is applied to the said switching input, a generator of a succession of signal pulses being connected to the switching inputs of the bistable elements, transfer input signal for one bistable element being derived from another bistable element so that the succession of signal pulses applied to the switching inputs causes a cyclic sequence of changes of state of the bistable elements, the field windings being connected in due order to the two alternative voltage levels through a switching mechanism controlled by the outputs of the bistable elements.

3. A stepping motor arrangement as claimed in claim 2, wherein certain of the field windings are switched under the control of the first outputs of the bistable elements associated respectively with those field windings, while the other field windings are switched under the control of the second outputs of the respective associated bistable elements.

4. A stepping motor arrangement as claimed in claim 3, wherein alternatively operable configurations of interconnection between the outputs and the transfer inputs of the bistable elements are provided corresponding to forward and reverse driving cycles respectively, and means are provided for selecting which configuration of interconnection is rendered operative.